United States Patent [19]

Ostergaard

[11] Patent Number: 5,272,964
[45] Date of Patent: Dec. 28, 1993

[54] APPARATUS FOR INJECTING PICKLE INTO MEAT PRODUCTS

[75] Inventor: Anders Ostergaard, Dalmose, Denmark

[73] Assignee: Wolfking Danmark A/S, Slagelse, Denmark

[21] Appl. No.: 7,634

[22] Filed: Jan. 21, 1993

[30] Foreign Application Priority Data

Mar. 20, 1992 [DK] Denmark .............................. 0370/92

[51] Int. Cl.⁵ .......................... A22C 17/00; A23L 1/31
[52] U.S. Cl. ......................................... 99/533; 99/535
[58] Field of Search .................. 99/486, 487, 494, 516, 99/532–535; 426/281, 652, 231, 264

[56] References Cited

U.S. PATENT DOCUMENTS

| | | | |
|---|---|---|---|
| 2,756,666 | 7/1956 | Zaenkert | 99/533 |
| 3,016,004 | 1/1962 | Harper, Jr. et al. | 99/533 |
| 3,386,369 | 6/1968 | Vogt | 99/532 |
| 3,675,567 | 7/1972 | Rejsa et al. | 99/533 |
| 3,695,166 | 10/1972 | Hoffmann | 99/533 |
| 3,739,713 | 6/1973 | Kudale et al. | 99/487 |
| 4,142,000 | 2/1979 | Townsend | 426/281 |
| 4,220,669 | 9/1980 | Townsend | 426/281 |
| 4,254,151 | 3/1981 | Townsend | 426/231 |
| 5,071,666 | 12/1991 | Handel et al. | 426/652 |
| 5,109,761 | 5/1992 | Gray | 99/517 |
| 5,142,971 | 9/1992 | Norrie | 99/487 |

FOREIGN PATENT DOCUMENTS

| | | |
|---|---|---|
| 0191712 | 6/1988 | European Pat. Off. . |
| 2703435 | 8/1977 | Fed. Rep. of Germany ........ 99/532 |
| 3119797 | 12/1982 | Fed. Rep. of Germany . |

*Primary Examiner*—Timothy F. Simone
*Attorney, Agent, or Firm*—Ladas & Parry

[57] ABSTRACT

Apparatus for injecting pickle into meat products comprising a multiple needle injector with needles, a crank mechanism operated by a motor and connected with the multiple needle injector to move the injector upward and downward, a transport mechanism positioned below the injector, a motor speed regulator to control the speed of the motor and an input signal for deducing the position of the injector.

8 Claims, 2 Drawing Sheets

APPARATUS FOR INJECTING PICKLE INTO MEAT PRODUCTS

TECHNICAL FIELD

The present invention relates to an apparatus for the injection of pickle into meat products.

The said apparatus is generally used for treating pieces of raw meat such as hams, bacon and shoulder meat pieces and deboned backs by injecting a pickle containing various salts, sugar, spices and preservatives evenly distributed into the pieces of meat, partly to achieve a desirable taste and color of the product, and partly to achieve an evenly distributed weight increase.

BACKGROUND ART

The motor is generally driven at a constant speed, whereby the vertical speed of the needle head as a consequence of the function of the crank-drive is sinusoidal, so that the pickle distribution in the meat product due to the varying speed of the needle head will also vary, the needles having varying retention time in the various meat layers, whereby meat areas in which the needles have a high speed will receive a smaller amount of pickle than meat areas in which the needles have a lower speed.

In order to remedy this problem it has been suggested to utilize mechanical curve path systems, partly capable of compensating for the sinusoidal speed variation of the crank throw and thus providing the needle head with an almost constant speed in the injection area. Such systems do, however, have the disadvantage that they are rapidly worn and costly to manufacture and maintain, and also are noisy.

DISCLOSURE OF THE INVENTION

Thus, it is the object of the invention to further develop an apparatus of the above-mentioned kind in such a way that the above-mentioned disadvantages are remedied. This object is achieved according to the invention by means of an apparatus a pickle or multiple needle injector with a number of injection needles supplied with pickle under pressure, the individual injection needles being controlled by means of a valve arrangement to only supply the pickle during the downward movement of the injection needle through the meat product, a crank mechanism driven by a motor and connected with the multiple needle injector to cause the injector to move upward and downward, and a transport mechanism positioned below the multiple needle injector and progressing horizontally, the mechanism advancing the meat products below the multiple needle injector synchronously with the upward and downward movement of the injector, characterized by incorporating a motor speed regulator which receives an input signal, from which the position of the multiple needle injector can be deduced, the speed of the motor can be regulated so as to compensate for the sinusoidal movement of the crank, whereby the vertical downward speed of the multiple needle injector can be maintained mainly constant in the area wherein the injection needles supply pickle to the meat products.

In a preferred embodiment a position detector connected with the multiple needle injector is utilized to produce the input signal to the motor speed regulator. Thereby it is possible to achieve a linear relation between the actual position of the multiple needle injector and the input signal to the motor speed regulator.

In another preferred embodiment it is a detector mounted on the crankshaft that produces the input signal to the motor speed regulator. Thereby one achieves that the signal emitted to the motor regulator can be directly proportional to the angle of the crank, so that this angle can be utilized partly to deduce the position of the multiple needle injector, partly to deduce the actual speed of the motor.

By utilizing a detector mounted on the motor shaft to produce the input signal to the motor speed regulator, a signal is achieved which directly can form part of the speed control loop of the motor regulation, whereby the position of the multiple needle injector in this case must be calculated, as the gear ratio existing between the motor and the crankshaft must be taken into consideration.

By utilizing a three-phase asynchronous motor and driving the said motor by means of a frequency converter, an advantageous construction of the apparatus as regards wear is achieved.

By controlling the output frequency of the frequency converter wherein the output frequency of the frequency converter is $f = f_{90}$: sinus $a + f_k$, wherein a is the angle of the crank compared to vertically upwards, $f_k$ is a compensating frequency which allows for mechanical and electronic inertias of/the apparatus and $f_k + f_{90}$ is the frequency of the motor voltage at a crank angle of 90°, it is possible to achieve a straight line of the speed progression in the injection area by combining the speed curve of the crank and the rotation curve of the motor.

By controlling the motor speed so that it is as high as possible in the area outside the area wherein the injection needles supply pickle to the meat products, it is possible to achieve the advantage of an essential increase of the cycle speed of the apparatus.

BRIEF DESCRIPTION OF THE DRAWINGS

The invention will be explained in more detail below with reference to the drawing, wherein.

DESCRIPTION OF THE PREFERRED EMBODIMENTS

Figure 1:
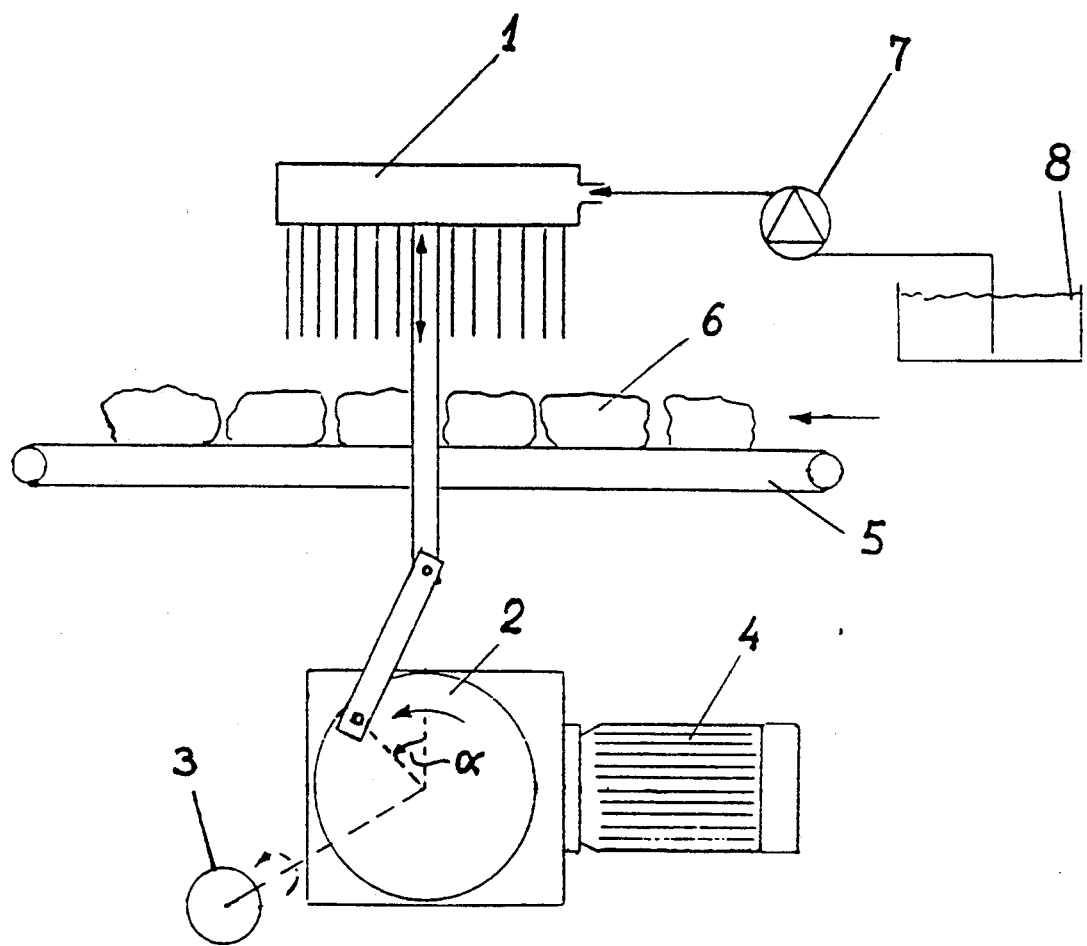
FIG. 1 shows an embodiment of an apparatus according to the invention.
Figure 2:
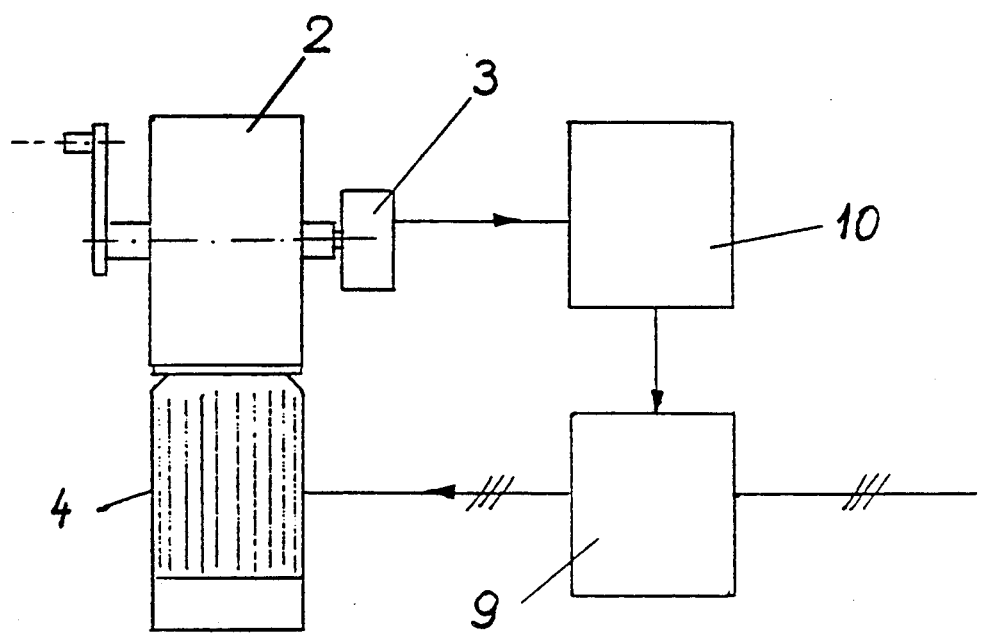
FIG. 2 schematically shows the connections of the motor control.

The apparatus according to the invention shown in FIG. 1 for the injection of pickle into meat products comprises a multiple needle injector 1 with a number of injection needles, which by means of a crank mechanism 2 are moved upward and downward, the upward and downward movement of the multiple needle injector 1 being controlled by means of a not-shown parallel guidance mechanism. The crank mechanism 2 is driven by a motor 4, a not shown gearing existing between the motor shaft and the crankshaft. A detector 3 is mounted on the crankshaft, the detector emitting a signal, by means of which the position of the crank and thereby the position of the multiple needle injector can be deduced. The meat products 6 are advanced below the multiple needle injector by means of a horizontally progressing transport mechanism 5, which advances the meat products 6 during that part of the movement of the multiple needle injector where the injection needles are not in contact with the meat products 6. The multiple needle injector 1 is supplied with pickle under pressure from a storage tank 8 by means of a pump 7. In the shown embodiment the motor 4 is controlled, as shown in FIG. 2, by means of a frequency converter 9 receiving its power supply from a three-phase supply network and producing a three-phase voltage with controlled frequency to the motor 4. The output frequency of the frequency converter 9 is controlled by an electronic control unit 10, which in accordance with the signal received from the angle gauge 3 emits a control signal to the frequency converter 9.

If the speed of the motor 4 is maintained constant, the vertical speed of the multiple needle injector 1 as a consequence of the crank-drive is described by $v = v_{90} \times \sin a$, wherein $v$ = the speed of the needle head, $v_{90}$ = the speed of the needle head at a crank angle of 90° and $a$ = the angle of the crank compared to vertical. In order to compensate for this sinusoidal speed the electronic control unit 10 emits a frequency control signal to the frequency converter 9, so that the motor 4 is supplied with a frequency which approximately can be described by $f$ ($f_{90}$:sinus a)+fK, wherein f = the actual frequency of the motor voltage, fK = a compensating frequency which provides for mechanical and electronic inertias in the system, $a$ = the angle of the crank compared to vertical, and $f_{90}$+fK = the frequency of the motor voltage at a crank angle of 90°.

This compensation can, of course, only be performed in case of angles a deviating somewhat from 0° and 180°, respectively, and according to the invention the compensation is performed during that part of the movement of the crank arm, where the injection needles supply pickle to the meat products 6, which generally is the range given by approximately 45°<a<approximately 135°. During the remaining part of the movement of the crank the speed of the motor may advantageously be adjusted up to a maximum, whereby the cycle speed of the apparatus can be increased considerably.

The detector 3 may, of course, also be utilized in connection with controlling the transport mechanism 5, which must advance the meat products 6 during that part of the movement of the multiple needle injector 1 where the injection needles are not in contact with the meat products 6, which generally corresponds to the range −45°a<45°.

In the mentioned embodiment the motor 4 is a three-phase asynchronous motor, the detector 3 is an angle gauge positioned on the crankshaft, and the control comprises a frequency converter 9 as well as an electronic control unit 10, but several variations of this constellation may be contemplated. By way of example, the detector 3 may be a linear position detector connected with the multiple needle injector 1, so that the control is capable of performing a direct positional control of the multiple needle injector 1. Alternatively, the detector 3 may be mounted directly on the motor shaft, in which case the position of the multiple needle injector 1 must be calculated by means of the position of the motor shaft, regard being had to the gearing existing between the motor shaft and the crankshaft. Thereby it becomes possible to utilize the signal emitted by the detector 3 to establish a speed feedback for the motor 4 by means of the output signal from the detector 3.

The motor 4 could alternatively be a DC-motor or a servomotor, in which case the control 9, 10 must be modified in accordance herewith.

I claim:

1. In an apparatus for injection of pickle into meat products having a pickle or multiple needle injector with a number of injection needles supplied with pickle under pressure;
   a crank mechanism driven by a motor and connected with the multiple needle injector to cause the needle injector to move upward and downward;
   a valve arrangement to control the needles to supply the pickle only during the downward movement of the needles;
   a transport mechanism positioned below the needle injector to transport the meat products horizontally below the needle injector synchronously with the upward and downward movement of the needle injector;
   wherein the improvements comprises
   a motor speed regulator;
   an input signal by means of which the position of the needle injector can be deduced;
   said motor speed regulator controlled by the input signal so that said motor speed regulator controls the speed of the motor so that the downward movement of the needle injector is essentially constant.

2. The apparatus according to claim 1, characterized by a position detector connected with the multiple needle injector, the position detector producing the input signal to the motor speed regulator.

3. The apparatus according to claim 2, wherein the detector is mounted on a crankshaft.

4. The apparatus according to claim 2, wherein the detector is mounted on a motor shaft.

5. The apparatus according to claim 1, wherein the input signal also deduces a motor speed signal to regulate motor speed to achieve a speed feedback.

6. The apparatus of claim 1, characterized in that the motor is a 3-phase asynchronous motor and the control is performed by means of a frequency converter.

7. The apparatus according to claim 6, characterized in that the output frequency of the frequency converter is $f = f_{90}$; sinus $a + f_k$, wherein a is the angle of the crank compared to vertically upwards, $f_k$ is a compensating frequency which allows for mechanical and electronical inertias of the apparatus and $f_k + f_{90}$ is the frequency of the motor voltage at a crank angle of 90°.

8. The apparatus according to claim 1, characterized in that the motor speed is controlled to be as high as possible outside the area wherein the injection needles supply pickle to the meat products.

* * * * *